United States Patent
Hoffmann et al.

(10) Patent No.: US 9,806,588 B2
(45) Date of Patent: Oct. 31, 2017

(54) ELECTRIC MOTOR

(75) Inventors: Martin Hoffmann, Zweibruecken (DE); Gerhard Huth, Hohenroth-Leutershausen (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 0 days.

(21) Appl. No.: 14/381,692

(22) PCT Filed: Feb. 28, 2012

(86) PCT No.: PCT/EP2012/053342
§ 371 (c)(1),
(2), (4) Date: Aug. 28, 2014

(87) PCT Pub. No.: WO2013/127436
PCT Pub. Date: Sep. 6, 2013

(65) Prior Publication Data
US 2015/0061451 A1    Mar. 5, 2015

(51) Int. Cl.
*H02K 1/27* (2006.01)
*H02K 16/04* (2006.01)
(Continued)

(52) U.S. Cl.
CPC ............. *H02K 16/04* (2013.01); *H02K 1/278* (2013.01); *H02K 3/47* (2013.01); *H02K 3/522* (2013.01)

(58) Field of Classification Search
CPC .......... H02K 1/278; H02K 16/04; H02K 3/47; H02K 3/522
(Continued)

(56) References Cited

U.S. PATENT DOCUMENTS

| | | | | |
|---|---|---|---|---|
| 2,085,099 A | * | 6/1937 | Jones | ........................ H02K 3/12 310/208 |
| 2,840,786 A | * | 6/1958 | Schunemann | .......... H01P 1/125 200/504 |

(Continued)

FOREIGN PATENT DOCUMENTS

| | | |
|---|---|---|
| CN | 1652433 A | 8/2005 |
| CN | 101752929 A | 6/2010 |

(Continued)

OTHER PUBLICATIONS

Table of materials relative permeability.*
(Continued)

*Primary Examiner* — Ahmed Elnakib
(74) *Attorney, Agent, or Firm* — Henry M. Feiereisen LLC

(57) ABSTRACT

An electric motor comprising a rotor which has a plurality of permanent magnets arranged along a circumferential direction, a stator arrangement with a winding arrangement which surrounds, at least in parts, the permanent magnets. Said stator arrangement comprises a first stator having a plurality of windings and the stator arrangement comprises a second stator, the windings of the first and second stators being embodied, respectively as frame-shaped coils, said coils of the first stator being arranged in the radial direction on the outside of the permanent magnets, the coils of the second stator being arranged in the radial direction inside the permanent magnets, and the coils are arranged along the winding axis thereof in the radial direction and the permanent magnets are arranged along the magnetization direction thereof in the radial direction.

8 Claims, 4 Drawing Sheets

(51) Int. Cl.
*H02K 3/47* (2006.01)
*H02K 3/52* (2006.01)
(58) Field of Classification Search
USPC ............ 310/198, 266, 156.35, 12.15, 49.05,
310/49.29, 49.51, 140, 112, 216.002, 113
See application file for complete search history.

(56) References Cited

U.S. PATENT DOCUMENTS

| | | | | |
|---|---|---|---|---|
| 5,081,388 | A | * | 1/1992 | Chen ................... H02K 21/12 310/156.01 |
| 5,723,933 | A | * | 3/1998 | Grundl .................. H02K 3/04 310/208 |
| 5,955,806 | A | * | 9/1999 | Devenyi ................ H02K 26/00 310/156.26 |
| 7,126,309 | B1 | | 10/2006 | Takeuchi et al. |
| 2003/0062797 | A1 | * | 4/2003 | Horng .................... H02K 3/28 310/254.1 |
| 2005/0168095 | A1 | * | 8/2005 | Tanimoto ............... H02K 3/18 310/208 |
| 2007/0126307 | A1 | * | 6/2007 | Fei ......................... H02K 17/06 310/184 |
| 2008/0246363 | A1 | * | 10/2008 | Atarashi ............. H02P 21/0003 310/156.35 |
| 2013/0154429 | A1 | * | 6/2013 | Schonbauer ............ H02K 3/12 310/208 |

FOREIGN PATENT DOCUMENTS

| | | |
|---|---|---|
| CN | 101982930 A | 3/2011 |
| DE | 10 2008 060 896 A1 | 2/2010 |
| EP | 1 858 142 A1 | 11/2007 |
| JP | 51-20514 | 2/1976 |
| JP | S5652769 Y2 | 12/1981 |
| JP | 63-257445 | 10/1988 |
| JP | 5-122880 | 5/1993 |
| JP | 6-165450 | 6/1994 |
| JP | H09322452 A | 12/1997 |
| JP | H1094232 A | 4/1998 |
| JP | H11122848 A | 4/1999 |
| JP | 2002-335658 | 11/2002 |
| JP | 2003-153516 | 5/2003 |
| JP | 4039458 B2 | 1/2008 |
| JP | 2008-54419 | 3/2008 |
| JP | 2008054419 * | 3/2008 |
| WO | WO 2005/117243 A1 | 12/2005 |
| WO | WO 2007/131789 A1 | 11/2007 |
| WO | 2011/077599 A1 | 6/2011 |
| WO | WO 2011/096888 A1 | 8/2011 |

OTHER PUBLICATIONS

English machine translation for JP 2008054419.*
English translation for JP 2008054419; Mar. 2008; Japan; Takahashi et al.*
English translation of JP 2008054419; Mar. 2008; Japan; Takahashi et al.*
Radius of Curvature—from Wolfram MathWorld.*
International Search Report mailed Nov. 15, 2012 for corresponding International Patent Application No. PCT/EP2012/053342.
Preliminary Rejection dated Jan. 15, 2016 in corresponding Korean Patent Application No. 10-2014-7027402, 7 pages.

* cited by examiner

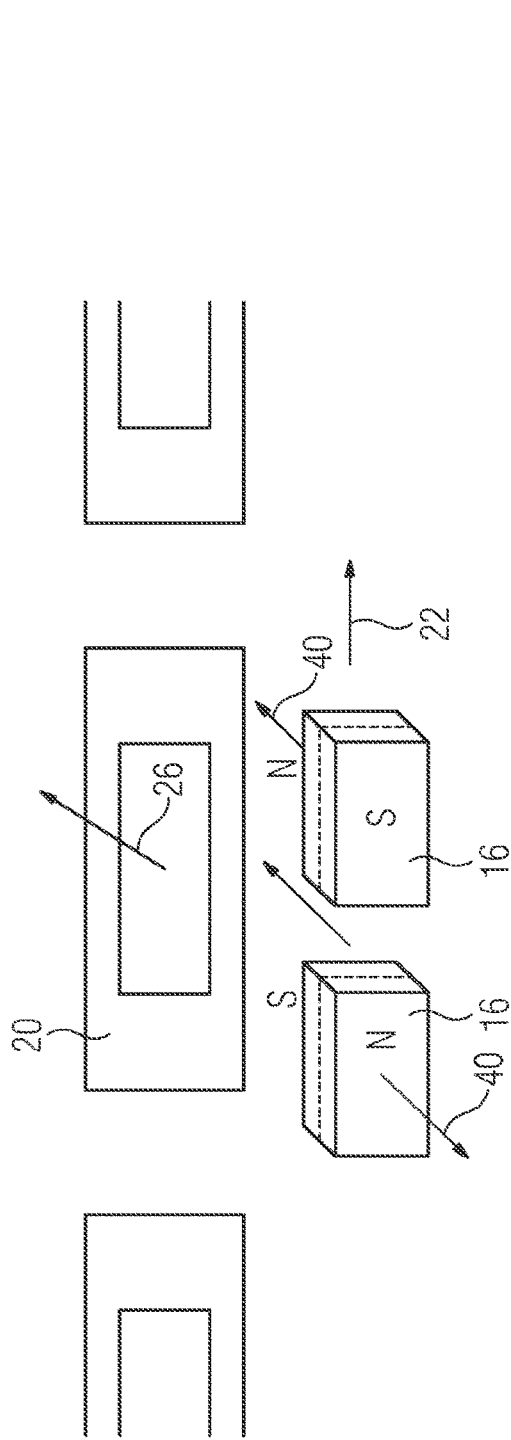
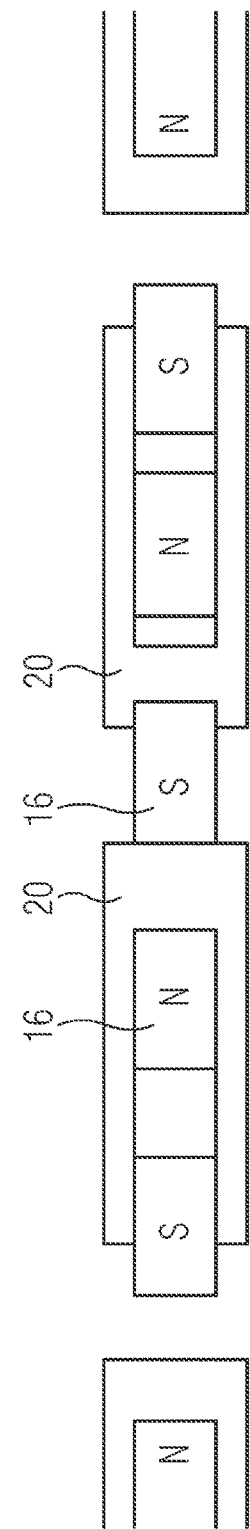
FIG 1
FIG 2

ELECTRIC MOTOR

CROSS REFERENCE TO RELATED APPLICATIONS

This application is based on and hereby claims priority to International Application No. PCT/EP2012/053342 filed on Feb. 28, 2012, the contents of which are hereby incorporated by reference.

BACKGROUND

The present invention relates to an electric motor comprising a rotor which has a plurality of permanent magnets arranged along a circumferential direction, and a stator arrangement with a winding arrangement which surrounds the permanent magnets, at least in regions.

Electric motors in the form of small drives, which have a low energy consumption, are gaining increasingly in significance. One field of application for such small drives is constituted, for example, by small pump drives and fan drives in automation devices. Furthermore, such small drives are preferably used in medical engineering. Small drives are generally designed for the maximum drive parameters. However, these small drives are usually operated in what is known as the part-load range. For the above-mentioned applications of these small drives, the drive function is integrated directly into the process in the sense of a mechatronic system. The electric motor in this case becomes an integrated built-in component.

Besides these constructional boundary conditions, these small drives are to be rotational-speed-variable. By way of example, the drive can thus be converter-fed and can thus have an intermediate voltage circuit with a pulse-controlled converter. In the case of transportable devices, it is additionally possible to replace the intermediate voltage circuit with a DC voltage source, for example a battery. Particularly for applications in medical engineering, electric motors that can provide a high torque and at the same time have a low weight, a high energy efficiency, exhibit low heating and have a high balance quality are usually desirable.

In order to achieve this, permanently excited AC voltage servomotors are nowadays usually used in conjunction with a pulse converter. In the case of these electric motors, the stators are usually formed with a laminated core provided with a winding, such that, with increasing rotational speed, the magnetization losses or core losses rise dominantly. Particularly in part-load operation, the practically load-independent core losses lead to a considerable worsening of the energy efficiency. In addition, the active parts of such electric motors usually comprise components made of iron, which constitute an undesirable weight component and can lead to detent torques.

A linear motor with a secondary part having permanent magnets and with a movable primary part having multi-phase windings through which current is passed is known from EP 1 858 142 A1. To increase the attainable drive forces, the permanent magnets are arranged in such a way that their north and south poles are arranged in series and poles with the same name are arranged adjacently in the direction of movement. In addition, the coils of the multi-phase windings are formed in such a way that they surround the permanent magnets of the secondary part, at least in regions.

The principle of the linear motor described in EP 1 858 142 A1 can also be transferred to a rotary motor. Here, the rotor has a plurality of permanent magnets arranged in the circumferential direction. The stator has a winding arrangement which surrounds the permanent magnets, at least in regions. For this purpose, the stator for example has coils curved in a U-shaped manner. However, a manufacturing of these coils is very elaborate and costly, in particular with small rotor diameters.

SUMMARY

One possible object is therefore to provide an electric motor of the type mentioned in the introduction that can be operated energy-efficiently and that can be manufactured easily and cost-effectively.

The inventors propose an electric motor that comprises a rotor which has a plurality of permanent magnets arranged along a circumferential direction, a stator arrangement with a winding arrangement which surrounds the permanent magnets, at least in regions, wherein the stator arrangement has a first stator having a plurality of windings, and wherein the stator arrangement has a second stator, the windings of the first and second stators are formed in each case as frame-shaped coils, the coils of the first stator are arranged in the radial direction outside the permanent magnets, the coils of the second stator are arranged in the radial direction inside the permanent magnets, the coils are arranged along their winding axis in the radial direction, and the permanent magnets are arranged along their magnetization direction in the radial direction.

The electric motor comprises a rotor, in which the permanent magnets are arranged side by side along the circumferential direction of the electric motor. The rotor can be coupled to a corresponding shaft, at which the torque of the electric motor can be tapped. Furthermore, the electric motor comprises a first, outer stator and a second, inner stator. The first and the second stator comprise corresponding windings in the form of coils, which are each arranged side by side in the circumferential direction. The permanent magnets in the rotor are thus surrounded by coils from two sides. A high magnetic force can thus be provided.

The electric motor can also be formed in such a way that it has just an outer stator or an inner stator with the associated coils. Alternatively, the electric motor, in addition to the coils of the first and second stator, may have further coils which surround the permanent magnets, at least in regions.

The coils of the first and second stator have substantially a frame-shaped form. The coils are formed of a wire winding and are formed in particular as air-cored coils, wherein they are arranged in the electric motor in such a way that they are arranged along their winding axis in the radial direction. In other words, the coils have through-openings, along which the coils are arranged in the redial direction of the electric motor. These coils can be easily manufactured as a separate component part and arranged in the electric motor. This coil type is suitable particularly for the use of electric motors with a small diameter or electric small drives. The electric motor therefore requires no slots and no iron yoke. There are thus no frequency-dependent magnetization losses. Furthermore, there are no detent torques caused by the fluctuation of the magnetic conductivity of the stator.

The permanent magnets are preferably arranged in such a way that the magnetization directions of adjacently arranged permanent magnets in the radial direction are oppositely directed. The magnetization direction of the respective permanent magnets extends from the south pole thereof to the north pole thereof. Due to such an arrangement of the permanent magnets, a compact design can be achieved in a simple manner. In addition, the permanent magnets can be manufactured easily and cost-effectively as individual parts, and a simple structure of the electric motor is thus additionally made possible.

In one embodiment, the coils have a greater spatial extension in a direction perpendicular to the winding axis than in the direction of the winding axis. In other words, the respective coils in the first and the second stator have a flat form. The coils are formed in particular as flat coils. The coils have the greatest spatial extension possible in the direction perpendicular to the winding axis. An increased force effect on the permanent magnets can thus be produced by the coils. In particular, the coils are to be formed such that the ratio of the electric power introduced into the winding to the mechanical power produced by the electric motor is reduced. A higher force and a higher torque can thus be produced by the higher electromagnetic utilization with constant current density. A high torque can thus be provided with the electric motor.

In one embodiment, the coils in the first and/or in the second stator have a curvature along the circumferential direction of the electric motor. Here, the coils of the second stator may have a greater curvature in the circumferential direction than the coils of the first stator. Due to the curvature of the coils in the circumferential direction, the electric field of the coils and the magnetic field produced by the permanent magnets of the rotor are arranged perpendicularly to one another. A very high force component can thus be produced in the circumferential direction, whereby a high torque can be produced with the electric motor.

In a further embodiment, a number of windings and/or a cross-sectional area of a wire of the windings of the coils in the first stator differ from a number of windings and/or a cross-sectional area of a wire of the windings of the coils in the second stator. The electric field produced by the coils can thus be easily adapted depending on the number of windings and/or the wire cross section. The number of windings and/or the wire cross section of the coils in the first and the second stator can also be adapted to the electric amperage applied to the coil.

The permanent magnets preferably substantially have the form of a hollow cylinder segment. When the electric motor is formed as a linear motor, cuboidal permanent magnets can be used. Permanent magnets that have such a geometry can be produced easily and cost-effectively. The permanent magnets may also have a cylindrical form. In addition, it is conceivable for the permanent magnets to have a curvature in the circumferential direction. This enables a simple and cost-effective manufacture of the electric motor.

The number of coils in the first and the second stator is preferably a multiple of three. Here, a coil of the first stator and a coil of the second stator that are aligned with one another in the radial direction of the electric motor are electrically connected in series. Alternatively, a coil of the first stator can be connected electrically in parallel with a coil of the second stator so that equal induced voltages are produced in the first and in the second stator. Here, the direction of the electric amperage, which is directed oppositely in a coil of the first stator and in a coil of the second stator associated with the same winding segment, is to be memorized. The coils can thus be operated easily with a three-phase voltage supply.

In one embodiment, the first and/or the second stator has/have a support structure having a plurality of support elements, which are configured for the winding of the coils. A type of winding aid is provided by the carrier elements. The first and the second stator can thus be manufactured in a simple manner.

The support structure and the support elements are preferably manufactured from an electrically insulating material, in particular from a material that has a relative permeability of one. Due to the electrically insulating material, around which the coils or the windings are arranged, no eddy current losses are caused. A particularly energy-efficient operation of the electric motor can thus be enabled. When a material with a relative permeability of $\mu_r=1$ is used, there are additionally no hysteresis losses.

The previously described principle of the electric motor and also the advantages and refinements thereof can also be transferred to a linear motor.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 1 shows a schematic perspective view of an arrangement of permanent magnets of a rotor and of coils of a first stator of an electric motor;

FIG. 2 shows an illustration of the arrangement of the permanent magnets and of the coils in a development;

DETAILED DESCRIPTION OF THE PREFERRED EMBODIMENT

Figure 3:
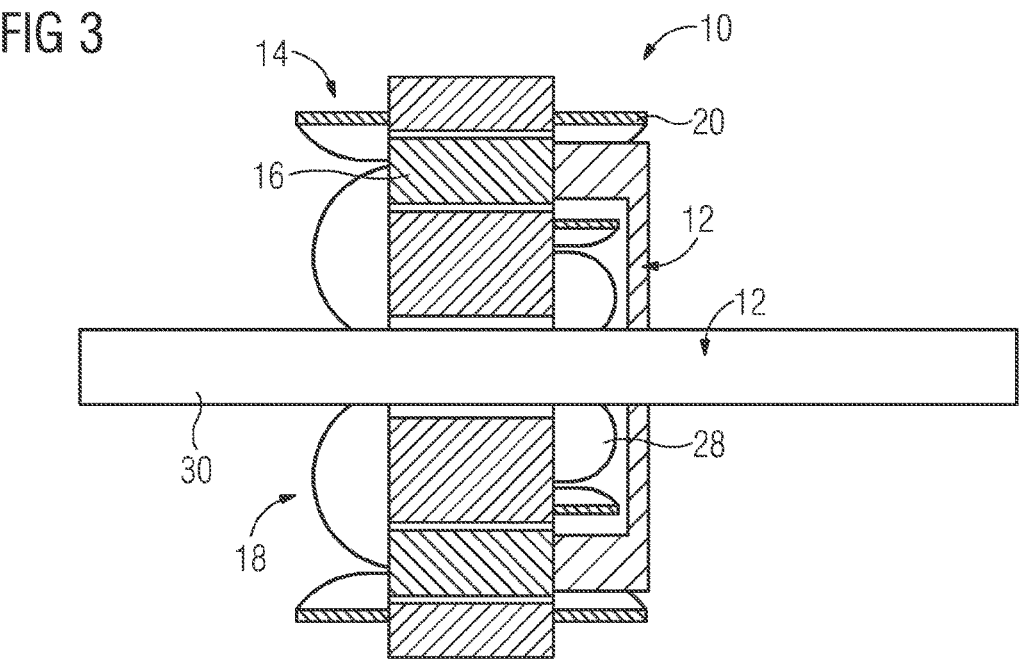
FIG. 3 shows a sectional side view of the electric motor.

Reference will now be made in detail to the preferred embodiments of the present invention, examples of which are illustrated in the accompanying drawings, wherein like reference numerals refer to like elements throughout.

FIG. 1, in a schematic perspective view, shows the arrangement of permanent magnets 16 of a rotor with respect to the coils 20 of a first stator of an electric motor. The permanent magnets 16 have a cuboidal form. The permanent magnets 16 are arranged side by side along the circumferential direction 22. here, the permanent magnets 16 are arranged along their magnetization direction 40, which extends from their south pole S to their north pole N, along the radial direction 24. Here, the permanent magnets 16 are arranged in such a way that the magnetization directions 40 of adjacently arranged permanent magnets 16 are oppositely directed.

The coils 20 of the first stator have a substantially frame-shaped form. Here, the coils 20 are arranged in the radial direction 24 outside the permanent magnets 16. In addition, the coils 20 are arranged in such a way that their winding axes 26 are arranged in the radial direction 24 of the electric motor.

FIG. 2 shows the arrangement formed of permanent magnets 16 and coils 20 in a development. The electric motor is formed such that the number N* of coils 20 is a multiple of the number three. The coils 20 can thus be connected to a three-phase voltage supply. An electric motor having the basic pole number 2p is thus formed. Here, the following laws apply:

The number of frame coils N* must be divisible by three:

$$N^* = \frac{3 \cdot p \cdot z}{n}.$$

For the quotient of the constant p/n, p/n must be an integer, wherein, in addition, n≠3, 6, 9, etc.

When z is an even number, each winding phase then is formed of 2p/n coil groups of z/2 frame coils each.

In the present case, the above-mentioned laws are presented for a 10-pole embodiment of the electric motor. Thus, the basic pole number is 2p=10. This gives the quotient of the constant z/n=2/5. Each winding side then includes of $$N^* = \frac{3 \cdot p \cdot z}{n} = \frac{3 \cdot 5 \cdot 2}{5} = 6$$

frame coils. Each of the three winding phases includes of 2p/n=10/5=2 coil groups, each with z/2=2/2=1 frame coil.

In the illustrations in FIGS. 1 and 2, the arrangement of the permanent magnets 16 and of the coils 20 of an electric motor is shown, the electric motor having a first, outer stator. The electric motor preferably additionally comprises a second, inner stator, in which the coils are arranged in the radial direction 24 inside the permanent magnets 16.

FIG. 3, in a sectional side view, shows an electric motor 10 which has ten poles. The electric motor 10 comprises a rotor 12, which is mechanically connected to a shaft 30. In addition, the rotor 12 comprises a plurality of permanent magnets 16, which are arranged on a radial disk and an axial hollow cylinder. Furthermore, the electric motor 10 comprises a first stator 14 having a plurality of coils 20. In addition, the electric motor comprises a second stator 18 having a plurality of coils 28. The coils 20 of the first stator 14 and the coils 28 of the second stator have a curvature in the circumferential direction 22 of the electric motor 10. The permanent magnets may also have a curvature along the circumferential direction 22.

Figure 4:
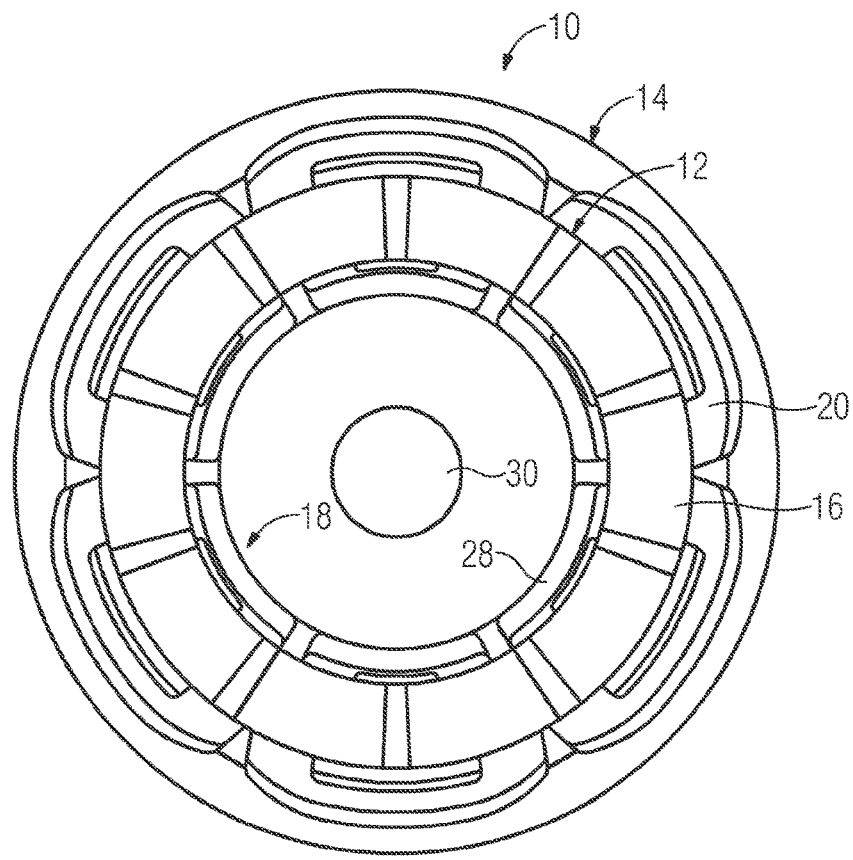
FIG. 4 shows a plan view of the electric motor.

FIG. 4 shows the electric motor 10 according to FIG. 3 in a plan view. Here, the rotor 12 of the electric motor can be seen and has ten permanent magnets 16. In addition, the first stator 14 is shown, which has six coils 20. The coils 20 of the first stator 14 are arranged here in the radial direction 24 of the electric motor 10 outside the permanent magnets 16 of the rotor 12. The second stator 18 also comprises six coils 28. Here, the coils 28 of the second stator 18 are arranged in the radial direction 24 inside the rotor 12.

Figure 5:
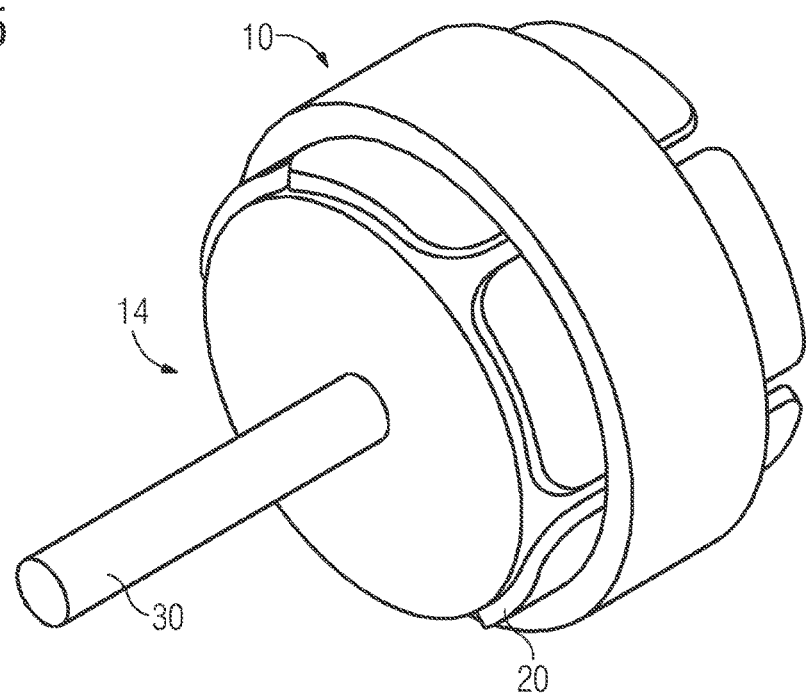
FIG. 5 shows a perspective illustration of the electric motor.
Figure 6:
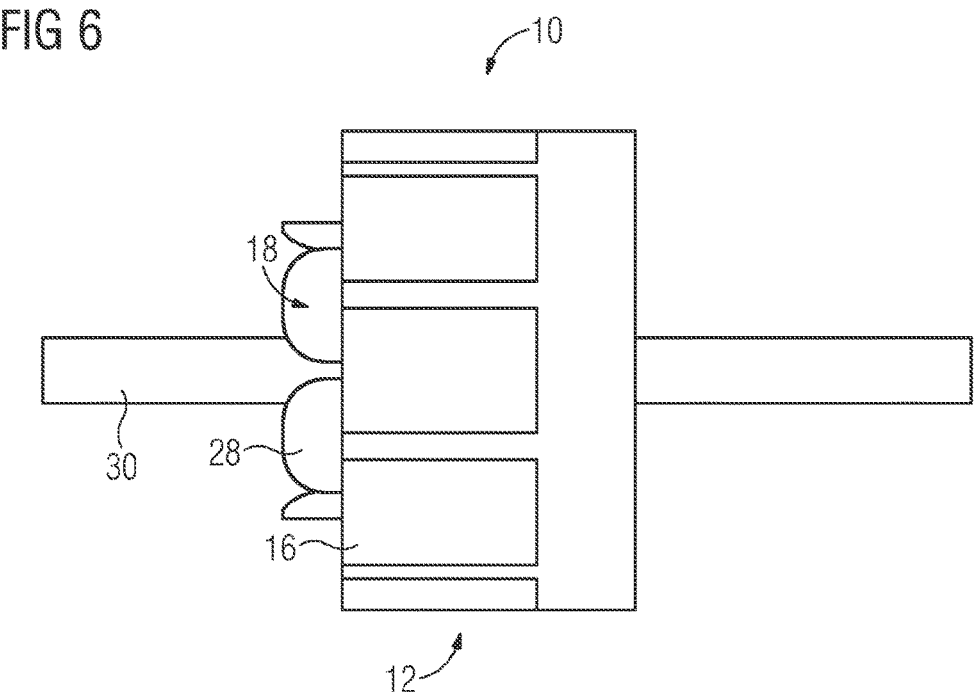
FIG. 6 shows a side view of the second stator and of the rotor of the electric motor.

FIG. 5 shows a perspective illustration of the electric motor 10 from the underside. Here, the coils 20 of the first stator 14 can be seen in particular. FIG. 6 shows a partial illustration of the electric motor 10 without the first stator 14. Here, the rotor 12 of the electric motor 10 with the permanent magnets 16 can be seen. Furthermore, the coils 28 of the second stator 14 are illustrated.

Figure 7:
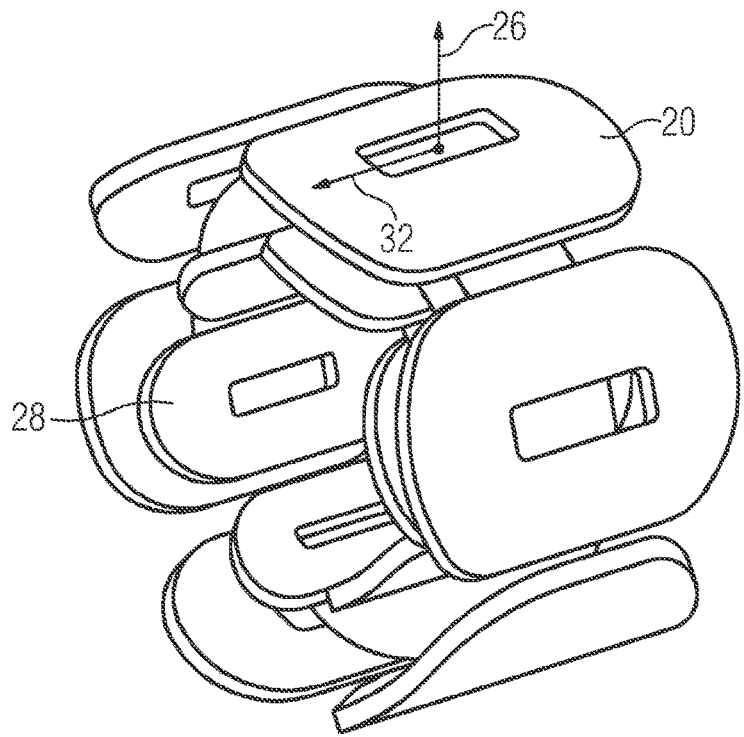
FIG. 7 shows a perspective illustration of an arrangement of the coils of the first and second stator.

FIG. 7, in a perspective illustration, shows the arrangement of the coils 20 of the first stator 14 and of the coils 28 of the second stator 18. The coils 20, 28 each have a substantially frame-shaped structure. The coils 20, 28 are produced by a wound wire and thus form a corresponding air-cored coil. Here, the coils have a smaller spatial extension along the winding axis 26 than in a direction 32 that runs perpendicularly to the winding axis 26. In other words, the coils 20, 28 have a flat form. In particular, the coils 20, 28 are to be formed such that the ratio of the electric power introduced into the winding to the mechanical power is reduced. A higher force and a higher torque can thus be produced with constant current density.

Furthermore, the coils 20, 28 are curved along the circumferential direction of the electric motor 10. As illustrated in FIG. 7, the numbers of windings of the coils 20, 28 may differ. The coils 28 of the second stator 18 in this case have a lower number of windings than the coils 20 of the first stator 14. Here, the cross-sectional area of the wires of the coils 20 of the first stator 14 may also be formed differently compared with the cross-sectional area of the wires of the coils 28 in the second stator 18.

Figure 8:
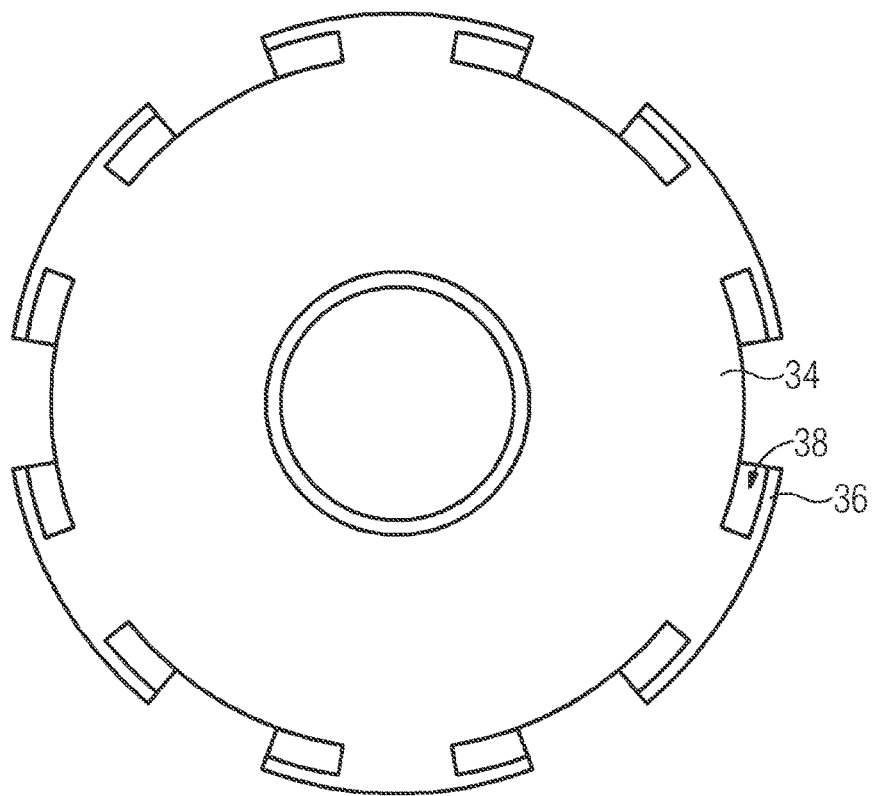
FIG. 8 shows a plan view of a support structure of the second stator.

FIG. 8 shows a plan view of the support structure 34 of the inner stator 18. Here, the support structure 34 has a plurality of support elements 36. The support elements 36 are formed by a protrusion in the radial direction, which has a recess 38 on two sides. The wire can be introduced into this recess 38 and the respective coils 28 can thus be wound. The support structure 34 and the support elements 36 are preferably formed from an electrically insulating material, which in particular has a relative permeability of one.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. An electric motor comprising:
   a rotor which rotates about an axis of rotation and has a plurality of permanent magnets arranged along a circumferential direction with respect to the axis of rotation, the permanent magnets each having a magnetization direction in a radial direction with respect to the axis of rotation; and
   a stator arrangement having first and second stators, the first and second stators each having a plurality of windings and located correspondingly radially outside and radially inside the rotor, the windings of the first and second stators being formed as frame-shaped coils, the coils of the first stator being arranged radially outside the permanent magnets with respect to the axis of rotation, such that the first stator at least partially surrounds the permanent magnets, the coils of the second stator being arranged radially inside the permanent magnets with respect to the axis of rotation, the coils of the first and second stators being wound around respective winding axes, which extend in respective radial directions with respect to the axis of rotation, each öf the coils in the first stator and/or in the second stator having an individual curvature along the circumferential direction of the electric motor,
   wherein each of the coils in the first stator and in the second stator have a uniform thickness with a size in the radial direction which is smaller than a size in the circumferential direction and than a size in a direction of the axis of rotation of the rotor,
   wherein the coils of the first stator have a different curvature in the circumferential direction than the coils of the second stator so that the coils of the first stator and the coils of the second stator have shapes drawn from different centers and thus are non-concentric relative to one another, and the coils of the first and second stators have a greater spatial extension in the direction of the axis of rotation of the rotor than in the circumferential direction, and the circumferential extension of each of the coils of the first stator located radially outside of the rotor is greater than the circumferential extension of each of the coils of the second stator located radially inside the rotor, wherein the coils of the second stator located radially inside the rotor have a lower number of windings than the coils of the first stator located radially outside the rotor and are shorter in the circumferential direction that the coils of the first stator, and wherein the coils of the first stator located radially outside the rotor are formed from a wire having a first cross-sectional area, the coils of the second stator located radially inside the rotor are formed from a wire having a second cross-sectional area, and the first cross sectional area is different from the second cross sectional area.

2. The electric motor as claimed in claim 1, wherein the permanent magnets are arranged to have alternating magnetization directions around a circumference of the rotor such adjacent permanent magnets have magnetization directions oriented radially oppositely with respect to the axis of rotation.

3. The electric motor as claimed in claim 1, wherein the permanent magnets are arranged to form a hollow cylinder.

4. The electric motor as claimed in claim 1, wherein
the first stator is formed from a first number of coils,
the second stator is formed from a second number of coils, and
each of the first number and the second number is a multiple of three.

5. The electric motor as claimed in claim 1, wherein at least one of the first stator and the second stator has a support structure having a plurality of support elements, around which wires are wound to form the coils.

6. The electric motor as claimed in claim 5, wherein the support elements each extend radially outwardly from the support structure.

7. The electric motor as claimed in claim 5, wherein the support structure and the support elements ara manufactured from an electrically insulating material that has a relative permeability of one.

8. The electric motor as claimed in claim 5, wherein a cross-section of the coils, taken in a direction perpendicular to the winding axis, has a substantially rectangular shape.

* * * * *